J. A. STEINMETZ.
PROVIDING A LAUNCHING WAY FOR AIRCRAFT.
APPLICATION FILED APR. 4, 1918.
1,363,539.                             Patented Dec. 28, 1920.
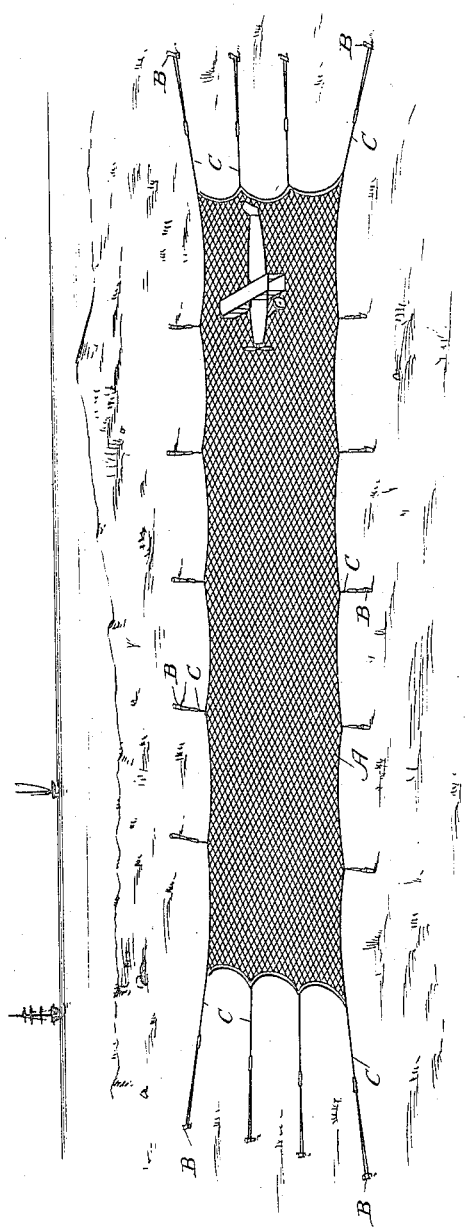
Witness
Edwin L. Bradford
Inventor
Joseph A. Steinmetz
By
Attorneys

UNITED STATES PATENT OFFICE.

JOSEPH A. STEINMETZ, OF PHILADELPHIA, PENNSYLVANIA.

PROVIDING A LAUNCHING-WAY FOR AIRCRAFT.

1,363,539.     Specification of Letters Patent.     Patented Dec. 28, 1920.

Application filed April 4, 1918. Serial No. 226,604.

*To all whom it may concern:*

Be it known that I, JOSEPH A. STEINMETZ, a citizen of the United States, and resident of Philadelphia, in the county of Philadelphia and State of Pennsylvania, have invented certain new and useful Improvements in Providing a Launching-Way for Aircraft, of which the following is a specification, reference being had therein to the accompanying drawing.

It frequently happens, particularly in "flat" country or after much rain, that an aviator is unable to leave the earth because he cannot obtain the necessary initial speed by a short run, even on regular aviation fields. Quicksands, or common dry sand, on areas otherwise favorable frequently make ascent impossible, snow must be removed, and an area apparently favorable, when seen from above, for landing proves to be sand, rough ground, or swamp from which ascent or any escape is practically impossible.

It has recently happened that noted aviators have been unable to make scheduled trips from well known aviation fields because rain made necessary initial speed on the fields impossible, and it has therefore been proposed to equip such fields with suitable starting platforms of wood. There are serious objections to this idea, and at best it is available only on permanent fields. In accordance with this invention, a long relatively narrow net, of somewhat close mesh, is stretched upon the ground which it is desired to use as a runway. When such nets are provided on regular fields they can be spread ready for use in a few minutes. Often it is quite feasible to carry a suitable net upon an aeroplane so that it may be ready for use after forced descent in hostile territory, and at other times an aviator may by prearranged signal call for a net and so save much time, if not his machine, liberty or life.

The accompanying drawing shows in perspective a net stretched on a sandy beach from which flight would otherwise hardly be possible.

In this figure, A. represents a strong net of rather close mesh and elongated form preferably drawn very taut and secured to pegs B, usually by ties C, or when convenient attached to stumps, trees, rocks or the like. The net, when used on regular aviation fields, may be of wire, the fabric being readily rolled and unrolled, but usually textile material is preferred. The net is equally effective on bogs and furrows or otherwise moderately rough ground.

What I claim is:

1. The method of securing for aeroplanes a practicable way upon unsuitable ground which consists in stretching a strong netting over the ground upon which the aeroplane is to move.

2. The method of rendering unsuitable ground suitable for the rapid advance of aircraft thereon which consists in covering the unsuitable ground with a netting of small mesh, under strong tension.

3. The method of providing, for aircraft, a runway over unsuitable ground which consists in providing a netting resting upon the ground, spanning depressions therein, and, through tension, resisting material deflection by the wheels of aeroplanes.

4. The combination with a suitable fine mesh net of a length equal to the necessary length of a starting runway for aeroplanes and adapted to assume plane form, of means for holding the forward end of the net against the pull of aeroplane wheels approaching that end while running upon the net spread flat upon the earth.

In testimony whereof I hereunto affix my signature.

JOSEPH A. STEINMETZ.

Witnesses:
F. DEWITT GOODWIN,
Y. L. SHALTVER.